United States Patent [19]

Washburn et al.

[11] Patent Number: 4,680,356

[45] Date of Patent: Jul. 14, 1987

[54] COLORLESS LIGAND-RELEASING MONOMERS AND POLYMERS AND THEIR USE TO PROVIDE DYES WITH METAL IONS

[75] Inventors: William N. Washburn, Ionia; Kenneth R. Hollister, Rochester, both of N.Y.

[73] Assignee: Eastman Kodak Company, Rochester, N.Y.

[21] Appl. No.: 764,152

[22] Filed: Aug. 9, 1985

Related U.S. Application Data

[62] Division of Ser. No. 688,224, Jan. 2, 1985, Pat. No. 4,577,998.

[51] Int. Cl.$^4$ ...................... C08F 28/06; C08F 226/06; C08F 234/02

[52] U.S. Cl. .................................... 526/256; 526/257; 526/258; 526/259; 526/261; 526/262; 526/263; 526/265; 526/266

[58] Field of Search ............... 526/274, 256, 257, 258, 526/261, 262, 263; 430/548, 359, 557

[56] References Cited

U.S. PATENT DOCUMENTS

| | | | |
|---|---|---|---|
| 2,449,966 | 9/1948 | Hanson, Jr. . | |
| 2,533,182 | 12/1950 | Sargent . | |
| 2,633,422 | 3/1953 | Jennings . | |
| 2,697,662 | 12/1954 | McQueen et al. . | |
| 3,227,550 | 1/1966 | Whitmore et al. | 430/548 |
| 3,451,820 | 6/1969 | Umberger . | |
| 3,515,557 | 6/1970 | Chu et al. . | |
| 3,660,092 | 5/1972 | Frank | 430/359 |
| 3,926,436 | 12/1975 | Monbaliu et al. . | |
| 4,142,891 | 3/1979 | Baigrie et al. . | |
| 4,340,664 | 7/1982 | Monbaliu et al. . | |
| 4,409,323 | 10/1983 | Sato et al. | 430/557 |

FOREIGN PATENT DOCUMENTS

| | | |
|---|---|---|
| 59-44773 | 2/1977 | Japan . |
| 56-05543 | 4/1977 | Japan . |
| 701843 | 3/1977 | United Kingdom . |

OTHER PUBLICATIONS

*Research Disclosure*, publication 17643, paragraph VII, Dec., 1978.

Schilt, *Talanta*, 13, pp. 895-902 (1966).

*Primary Examiner*—Joseph L. Schofer
*Assistant Examiner*—Peter F. Kulkosky
*Attorney, Agent, or Firm*—Paul L. Marshall

[57] ABSTRACT

Essentially colorless, hydrophilic ligand-releasing polymers are prepared from ethylenically unsaturated polymerizable monomers represented by the structure:

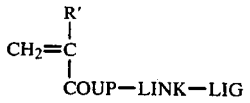

wherein R' is hydrogen or lower alkyl, COUP is a photographic color coupling moiety, LINK is a coupling-off group which can be cleaved by an oxidized developer composition, and LIG is a ligand capable of complexing with metal ions, while joined to the polymer, to form a dye. These polymers also have recurring units which impart hydrophilicity to the polymer. These polymers form metal complex dyes in unexposed areas of photographic elements only, while the ligand is cleaved from the polymer in the exposed areas and washed out of the element.

5 Claims, No Drawings

COLORLESS LIGAND-RELEASING MONOMERS AND POLYMERS AND THEIR USE TO PROVIDE DYES WITH METAL IONS

This is a division of application Ser. No. 688,224, filed Jan. 2, 1985, now U.S. Pat. No. 4,577,998.

REFERENCE TO RELATED APPLICATIONS

This application is related to the following commonly assigned applications, all filed on even date herewith: U.S. Ser. No. 688,478 now U.S. Pat. No. 4,568,633 by F. V. Lovecchio, J. A. Reczek and R. C. Stewart, U.S. Ser. No. 688,477 now U.S. Pat. No. 4,555,478 by J. A. Reczek and J. M. Palumbo, and U.S. Ser. No. 688,479 now U.S. Pat. No. 4,555,477 by W. N. Washburn.

FIELD OF THE INVENTION

This invention relates to color photography. In particular, it relates to essentially colorless, ligand-releasing monomers and polymers which can be used as masking dyes for color correction in photographic elements or to form reversal images in photographic elements. This invention also relates to such elements and to a process for dye formation.

BACKGROUND OF THE INVENTION

It is known that dyes used in multicolor photographic elements do not transmit all of the electromagnetic radiation desired by theoretical photographic considerations. For example, the cyan dye, which should absorb radiation in the red region and transmit radiation in the green and blue regions of the electromagnetic spectrum, usually absorbs a small amount of radiation in the latter regions as well. The magenta and yellow dyes commonly used also exhibit undesirable absorptions. The result of printing a multicolor image formed with such dyes is to introduce undesirable amounts of color image regardless of the printing process parameters and sensitivity of the element. Color correction is therefore desirable and is generally accomplished with masking in some manner.

U.S. Pat. No. 2,449,966 (issued Sept. 21, 1968 to W. T. Hanson, Jr.) and the art mentioned therein describe various means for color correction of multicolor photographic elements, including the use of preformed dyes. *Research Disclosure,* publication 17643, paragraph VII, December 1978 and references described therein also describe color masking dyes. (*Research Disclosure* is available from Kenneth Mason Publications, Ltd., The Old Harbourmaster's, 8 North Street, Emsworth, Hampshire P010 7DD, United Kingdom). However, the compounds commonly used for color correction are already colored at the time of imagewise exposure. If such dyes and silver halide are incorporated in the same layer of a multicolor photographic element, the dye will act as an unwanted filter, absorbing a portion of the incident radiation which otherwise would reach silver halide in underlying layers. This results in a loss of sensitivity (i.e. photographic speed). One way to reduce this problem is to put masking dyes in only one layer of the multicolor elements, which generally have three color-forming layers. This solution is not desirable if masking is needed in the other layers. Another way to eliminate the unwanted filtering effect is to have the silver halide and the dye in separate layers while maintaining them in reactive association. While this is a useful and practical solution, it increases the number of layers in the element, making it thicker and presenting manufacturing and imaging inefficiencies.

U.S. Ser. No. 688,479 of W. N. Washburn, noted above, describes color masking dyes generated from ballasted colorless couplers containing a coupling-off group which will generate a color masking dye upon complexation with metal ions, e.g. ferrous ions. Although polymeric compounds of this invention are broadly within the description of the Washburn application, the focus of the Washburn application and its examples is on nonpolymeric ligand-releasing compounds. Although those compounds and the process of using them represent a significant advance in the art, the nonpolymeric ligand-releasing compounds described therein are difficult to disperse in aqueous coating compositions, and therefore require the use of coupler solvents to accomplish dispersion and coating. However, coupler solvents reduce the rate of metallization (i.e. complexation with metal ions) of the nonpolymeric colorless ligand-releasing compounds in unexposed areas of the element. Hence, in the time generally acceptable for processing of photographic elements, less dye may be formed. To overcome this deficiency, the elements can be subjected to an additional metal ion bath treatment to increase the dye formation sufficiently.

Therefore, it would be highly desirable to have a means for dye formation (e.g. color correction) in photographic elements which would allow easy formulation of coating compositions and avoid coupler solvents and the problems associated with them.

SUMMARY OF THE INVENTION

The present invention provides essentially colorless, hydrophilic ligand-releasing polymers which provide an improved means of dye formation, e.g. for color masking unwanted absorption. The elements and process of using the polymers of this invention have all of the advantages of the materials of the Washburn application noted above, but in addition, they avoid the problems encountered with coupler solvents.

In particular, the polymers of this invention allow for more efficient dye formation by making the dye-forming ligand more accessible to metal ions for complexation. Acceptable dye formation can be achieved rapidly without the need for additional metal ion bath treatments due to more rapid metallization. These advantages are particularly important for color correction of unwanted absorption in photographic elements. It is a further unexpected advantage that the polymeric materials of this invention are photographically active in the absence of coupler solvents and can consequently be coated with less gelatin or other binders to provide thinner layers and attendant improved image sharpness.

Therefore, in accordance with this invention, an ethylenically unsaturated polymerizable monomer useful for preparing a polymer is represented by the structure:

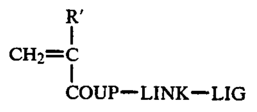

wherein R' is hydrogen or lower alkyl, COUP is a photographic color coupling moiety, LINK is a coupling-off group which can be cleaved from COUP by an oxidized developer composition, and LIG is a ligand capable of complexing with metal ions, while joined to the polymer, to form a dye.

This invention also provides an essentially colorless, hydrophilic ligand-releasing polymer comprises:

(a) recurring units derived from an ethylenically unsaturated polymerizable hydrophilic monomer in a number sufficient to render the polymer hydrophilic, and (b) recurring units derived from an ethylenically unsaturated polymerizable monomer represented above.

This invention further provides a photographic element comprising a support having thereon at least one silver halide emulsion layer having associated therewith the essentially colorless, hydrophilic ligand-releasing polymer described above.

Further, a process of dye formation in an imagewise exposed element like that described above comprises the steps of:

a. developing the imagewise exposed areas of the element with a color developing agent, thereby cleaving LINK-LIG from the polymer and washing substantially all of the cleaved LINK-LIG out of the element, and b. treating the element with metal ions to form a dye with the ligand-releasing polymer in the unexposed areas of the element.

DETAILED DESCRIPTION OF THE INVENTION

The advantages described above for this invention are attained because of the use of an essentially colorless, hydrophilic ligand-releasing polymer as a dyeformer. The polymers of this invention are "essentially colorless", meaning that prior to complexation of the LIG moiety with metal ions fo form a visible dye, the polymer exhibits essentially no observable color. That is, the polymer exhibits a low optical density (i.e. less than about 0.05), although it may emit or reflect electromagnetic radiation in the non-visible portions of the electromagnetic spectrum. Therefore, the LIG moiety and the metal ions "form" a colored dye from a colorless precursor, as opposed to compounds which are merely shifted in their absorption $\lambda_{max}$ upon complexation with a metal ion to provide a dye of a different color.

The polymers of this invention are hydrophilic, meaning that they are water-soluble or -dispersible (i.e. at least about 1 g of polymer can be dispersed or dissolved in 100 ml of water). The hydrophilicity of the polymers is provided by recurring units in the polymer which are derived from one or more ethylenically unsaturated polymerizable monomers which are hydrophilic in nature. For example, the monomers can be nonionic (uncharged or amphoteric) but have one or more uncharged solubilizing groups, such as hydroxy, amide (substituted or unsubstituted), sulfonamide and imino. Alternatively, the monomers can be anionic or cationic in charge having one or more anionic or cationic groups thereon, respectively. Such groups include but are not limited to carboxy, sulfo, phosphono, quaternary ammonium, and phosphonium groups. These recurring units are present in the polymer in amounts sufficient to render it hydrophilic as defined above. Generally, the polymer contains from about 10 to about 90, and preferably from about 40 to about 75, mole percent (based on total moles of monomers polymerized), of such recurring units.

Representative monomers which provide hydrophilicity include acrylamides and methacrylamides (e.g. acrylamide, methacrylamide, N-isopropylacrylamide, 2-acrylamido-2-hydroxymethyl -1,3-propanediol, etc.), hydroxyalkyl acrylates and methacrylates (e.g. 2-hydroxyethyl acrylate, 2-hydroxypropyl methacrylate, etc.), carboxylic phosphonic and sulfonic acid containing monomers and their salts (e.g. acrylic acid, methacrylic acid, itaconic acid, 2-acrylamido-2-methylpropane sulfonic acid, 3-methacryloyloxypropane-1-sulfonic acid, styrenesulfonic acid, vinyl sulfonic acid, and alkali metal and ammonium salts of such acids, etc.), cationic salts, such as m- and p-N-vinylbenzyl-N,N,N-trimethylammonium chloride, N-(2-methacryloyloxyethyl-N,N,N-trimethylammonium methosulfate, and others known to one skilled in polymer chemistry.

The polymers of this invention also comprise recurring units derived from one or more ethylenically unsaturated polymerizable monomers of this invention represented by the structure:

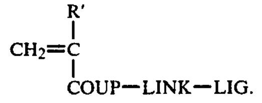

In this structure, R′ is hydrogen or lower alkyl (substituted or unsubstituted, preferably of 1 to 3 carbon atoms, e.g. methyl, chloromethyl, ethyl, propyl, etc.). More preferably, R′ is hydrogen or methyl, and most preferably, it is hydrogen.

The recurring units derived from the illustrated structure above are present in the polymer in amounts sufficient to provide desired dye density when the LIG moiety is complexed with metal ions. Generally, the polymer contains from about 10 to about 90, and preferably from about 40 to about 75, mole percent (based on total moles of monomers polymerized), of such recurring units.

COUP represents a photographic color coupling moiety derived from a conventional color-forming coupler which yields a colored product on reaction with an oxidized color developing agent, or which yields a colorless product on reaction with oxidized color developing agents. Both types of coupler moieties are well known to those skilled in the art and described, for example, in *Research Disclosure,* publication 17643, December 1978, paragraph VII, and references noted therein. *Research Disclosure* is available from Kenneth Mason Publications, Ltd., The Old Harbourmaster's, 8 North Street, Emsworth, Hampshire P010 7DD, United Kingdom.

Examples of COUP moieties useful in the practice of this invention include but are not limited to the following moieties which are shown linked to LINK-LIG and having an unsatisfied bond where COUP is attached to the polymer backbone either directly or through a suitable linking group, such as an amide or ester linkage:

I.

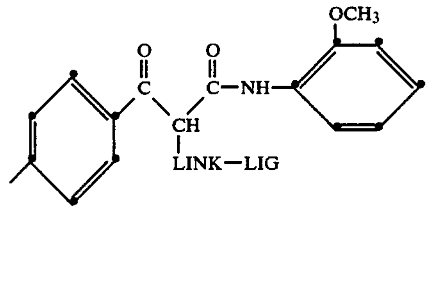

-continued

II.

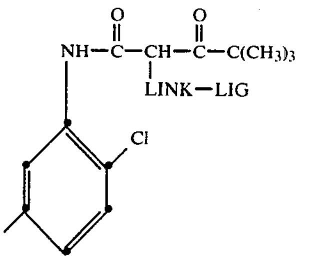

III.

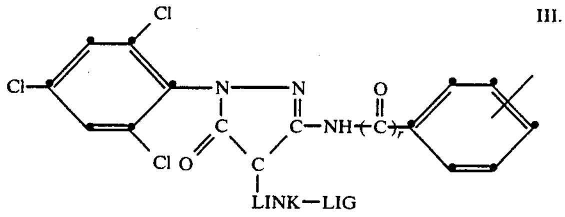

wherein r is 0 or 1,

IV.

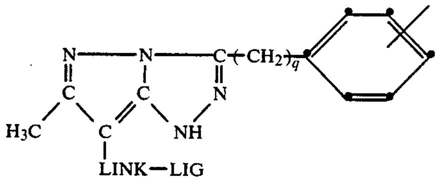

wherein q is an integer of 1 to 20,

V.

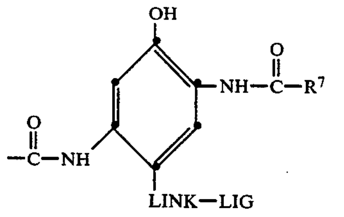

wherein $R^7$ is substituted or unsubstituted alkyl (preferably of 1 to 20 carbon atoms) or substituted or unsubstituted aryl (preferably of 6 to 14 carbon atoms, e.g. phenyl, naphthyl, p-methylphenyl, etc.),

VI.

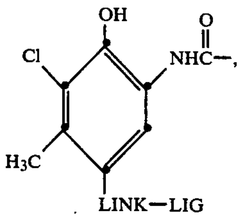

and

-continued

VII.

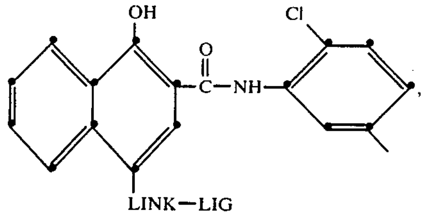

LINK is a coupling-off group which can be cleaved from COUP by an oxidized developer composition containing an oxidized color developer. The coupling-off groups are generally heteroatoms or heteroatom-containing linkages containing alkylene, arylene or heterocyclic groups appended to the heteroatoms. Many such coupling-off groups are known in the photographic art. Preferred groups include —COO—, —CONH—, —O—, —S—, $-SO_2O$, and $-SO_2NH-$. The timing groups described in U.S. Pat. Nos. 4,248,962 (issued Feb. 3, 1981 to Lau) and 4,409,323 (issued Oct. 11, 1983 to Sato et al) can also be used. An oxy group is a particularly useful coupling-off group in the practice of this invention.

LIG is a moiety, which when complexed with one or more metal ions, forms a visible dye. This metal-LIG complexation occurs while LIG is a part of the polymer in the unexposed areas of the element. In exposed areas, LINK-LIG is cleaved from the rest of the polymer by oxidized developing agent and substantially all of the cleaved LINK-LIG moiety is subsequently washed out during processing. Therefore, LINK-LIG is a moiety which is soluble enough to be washed out of the element once it is cleaved from the rest of the polymer. In the unexposed areas, the polymer is treated with metal ions (e.g. ferrous ions) which complex with the uncoupled LIG moiety to provide a visually colored dye.

Generally, the dyes formed upon complexation of the LIG moiety and metal ions are visibly colored dyes. That is, they absorb electromagnetic radiation in the so-called visible portion of the electromagnetic spectrum, i.e. between about 400 and about 700 nm. More than one molecule of a LIG moiety can be complexed with one metal ion. For example, there may be two or three LIG molecules complexed with a single metal ion. Representative dyes which can be formed are cyan, yellow and magenta dyes.

Useful LIG moieties can be obtained from ferroin type compounds such as hydrazones, tetrazolylpyridines, pyridylquinazolines, bis-isoquinolines, imines, phenanthrolines, bipyridines, terpyridines, bidiazines, pyridyldiazines, pyridylbenzimidazoles, diazyltriazines, o-nitrosoanilines and phenols, tetrazines, triazines described by Schilt et al in the journal *Talanta*, 15, pp. 475–478 (1968), pyridine derivatives of phenazine and quinoxaline described by Schilt et al in *Talanta*, 15, pp. 852–855 (1968), substituted benzimidazole derivatives as described by Schilt et al, *Talanta*, 15, pp. 1055–1058 (1968), oximes of substituted methyl and phenyl 2-pyridyl ketones as described by Schilt et al, *Talanta*, 16, pp. 448–452 (1969), and the like. Other ligand-providing compounds are described in the following *Talanta* literature articles: 16, pp. 519–522 (1969), 13, pp. 895–902 (1966), 17, pp. 649–653 (1970), 19, pp. 1025–1031 (1972), 21, pp. 831–836 (1974), 22, pp. 915–917 (1975), 23, pp. 543–545 (1976), 24, pp. 685–687 (1977), 26, pp. 85–89 (1979), pp. 863–865 (1981), 36, pp. 373–376 (1979), 55, pp. 55-58 (1980), 29, pp. 129-132 (1982), and in Blandamer et al, *J. Chem. Soc. Dalton*, pp. 1001-1008 (1978), and Case, *J. Org. Chem.*, 31, pp. 2398-2400 (1966). The terpyridines are particularly useful for obtaining magenta dyes.

Particularly useful LIG moieties are those derived from compounds represented by the structure:

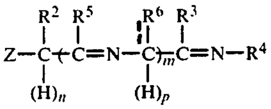

wherein m is 0 or a positive integer 1 to 3, n and p are independently 0 or 1, $\overset{--}{-}$ represents a single or double bond, Z is $R^1$—N=, O=, S=, $R^1$—P=, $(R^1)_2P$— or $(R^1)_3P$=, and when Z is $(R^1)_2P$—, n is 1, otherwise n is 0. Preferably, m is 0 or 1 and Z is $R^1$—N=.

$R^1$, $R^2$, $R^3$, $R^4$, $R^5$ and $R^6$ are independently hydrogen, amino (primary, secondary or tertiary), hydroxy, mercapto, alkoxy (preferably of 1 to 20 carbon atoms, e.g. methoxy, chloromethoxy, ethoxy, octyloxy, alkoxy substituted with imino, etc.), alkyl (preferably of 1 to 20 carbon atoms in the nucleus, e.g. methyl, ethyl, chloromethyl, isopropyl, t-butyl, heptyl, alkyl substituted with imino, etc.), aryl (preferably of 6 to 14 carbon atoms, e.g. phenyl, naphthyl, xylyl, p-methoxyphenyl, aryl substituted with imino, etc.), or a heterocyclic moiety (preferably having 5 to 20 carbon, nitrogen, sulfur or oxygen atoms in the nucleus, e.g. pyridyl, quinolyl, a heterocycle substituted with imino, etc.).

When $R^6$ is a group defined above, p is 1 and $\overset{--}{-}$ is a single bond.

Alternatively, if m is 0, $R^1$ and $R^2$, $R^2$ and $R^3$, and $R^3$ and $R^4$, taken together, can independently represent the carbon and heteroatoms (e.g. nitrogen, oxygen, sulfur, selenium, etc.) necessary to complete a substituted or unsubstituted 5 to 20 membered mono- or polycyclic carbocyclic or heterocyclic group (e.g. pyridine, quinolyl, triazinyl, phenanthrolinyl, pyrimidyl, etc.). The heterocyclic nucleus so formed can be substituted with one or more oxo, alkyl, amino, imino, aryl, phosphino (e.g. diphenylphosphino), alkoxy, amide, sulfonamide, thio or sulfo groups as defined above, or a heterocyclic group (e.g. pyridyl, pyrimidyl, thiazolyl, imidazolyl, thienyl, etc.).

If m is 1, 2 or 3, $R^1$ and $R^2$, $R^5$ and $R^6$, and $R^3$ and $R^4$, taken together, can independently represent the carbon and heteroatoms (e.g. nitrogen, oxygen, sulfur, selenium, etc.) necessary to complete a substituted or unsubstituted 5 to 20 membered mono- or polycyclic heterocyclic nucleus as defined above where m is 0. When $R^5$ and $R^6$ are so defined, p is 0 when $\overset{--}{-}$ is a double bond, and p is 1 when $\overset{--}{-}$ is a single bond.

Preferably, LINK-LIG is sufficiently soluble in processing solutions that when it is cleaved from the rest of the polymer, it can be washed out of the element. If desired, LIG can contain one or more solubilizing groups, e.g. sulfate, sulfonate, carboxylate, hydroxy or phosphate groups, to give it suitable aqueous solubility.

Examples of useful LIG moieties which form dye complexes with ferrous ions are shown below. In these structures, the point of attachment to the polymer backbone through COUP-LINK is represented by an unsatisfied bond. The $\lambda_{max}$ of each resulting ferrous ion-complex dye is also noted, however, the $\lambda_{max}$ can be shifted somewhat (e.g. 10-15 nm) depending upon the polymer backbone to which LIG is attached.

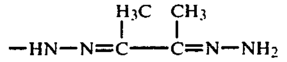

yellow, $\lambda_{max}$ = 442 nm

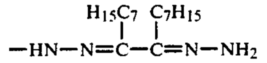

yellow, $\lambda_{max}$ = 443 nm

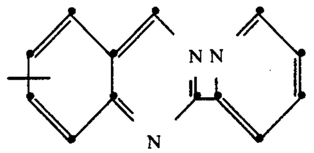

yellow, $\lambda_{max}$ = 441 nm

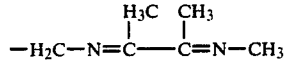

magenta, $\lambda_{max}$ = 564 nm

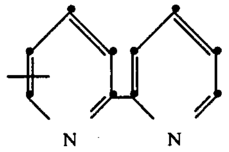

red, $\lambda_{max}$ = 522 nm

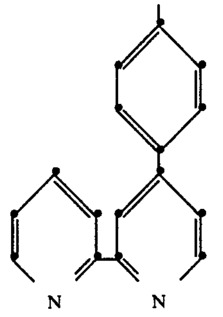

magenta, $\lambda_{max}$ = 536 nm

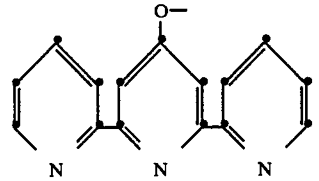

magenta, $\lambda_{max}$ = 552 nm

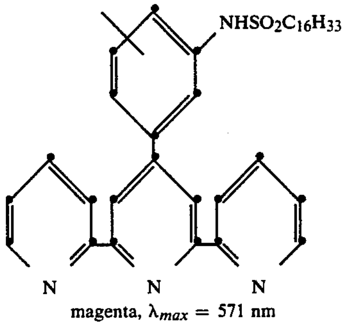

magenta, $\lambda_{max}$ = 571 nm

-continued

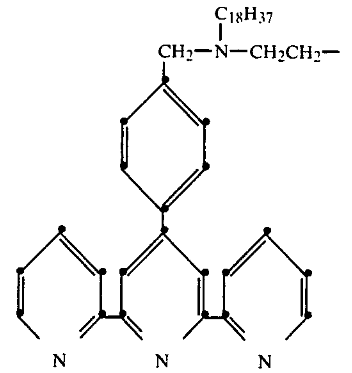

magenta, $\lambda_{max}$ = 567 nm

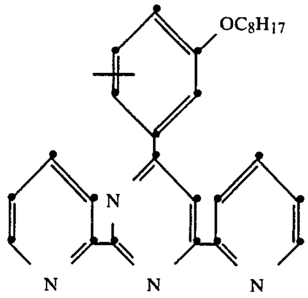

magenta, $\lambda_{max}$ = 583 nm

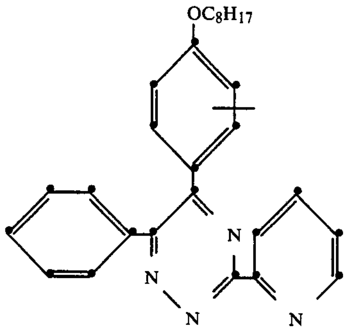

magenta, $\lambda_{max}$ = 557 nm

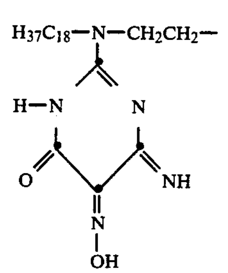

cyan, $\lambda_{max}$ = 644 nm

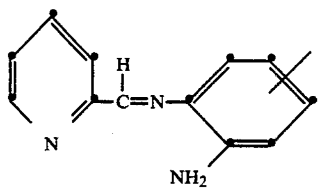

cyan, $\lambda_{max}$ = 670 nm and

-continued

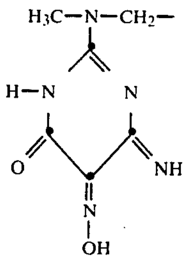

cyan, $\lambda_{max}$ = 650 nm.

The polymers of this invention can also comprise recurring units of one or more ethylenically unsaturated polymerizable monomers other than those described above in quantities that do not adversely affect hydrophilicity or dye-forming capabilities. The types and amounts of such monomers which would be useful are within the skill of a polymer chemist.

Representative polymers of this invention include the following:

poly{{{N-{{4-chloro-3-{4,4-dimethyl-2-[2,6-di(2-pyridyl)-4-pyridyloxy]-3-oxopentanamido}phenyl}}acrylamide-co-sodium 2-acrylamido-2-methylpropane-1-sulfonate}}}, poly{{{N-{{4-chloro-3-{4,4-dimethyl-2-[2,6-di(2-pyridyl)-4-(4-pyridyl)phenoxy]-3-oxopentanamido}phenyl}}acrylamide-co-sodium 2-acrylamido-2-methylpropane-1-sulfonate}}}, poly{{{{N-{{{4-chloro-3-{{4,4-dimethyl-2-{4-[6-phenyl-3-(2-pyridyl)-5-as-triazinyl]phenoxy}-3-oxopentanamido}}-phenyl}}}acrylamide-co-sodium 2-acrylamido-2-methylpropane-1-sulfonate}}}}, and poly{N-(4-acrylamido-2-chlorophenyl)-1-hydroxy-4-[2,6-di(2-pyridyl)-4-pyridyloxy]-2-naphthamide-co-sodium 2-acrylamide-2-methylpropane-1-sulfonate}.

The hydrophilic monomers useful in the practice of this invention can be prepared used well known chemical reactants and procedures. Most of them can be obtained commercially from a number of sources.

The ligand-releasing monomers of this invention are not generally available from commercial sources, but they can be prepared using chemical reactions and reactants known to one skilled in photographic chemistry and polymer chemistry. Generally, a compound from which the LIG moiety is derived is first reacted with a compound from which COUP is derived. A detailed synthesis of a representative polymer is provided in Example 1 below.

In certain embodiments, the following general preparatory techniques can be used:

(a) Reaction of a compound from which LIG is derived containing a hydroxy group with a color coupler containing a leaving group (e.g. halogen, tosylate, mesylate, sulfonium salt, etc.) in the coupling off position to produce a COUP-LINK-LIG compound having an oxy LINK group. Alternatively, a LIG moiety having a mercapto group can be used to obtain a COUP-LINK-LIG compound. This compound is then attached to a suitable ethylenically unsaturated polymerizable monomer (e.g. acrylic acid) by reacting one of its functional groups (e.g. amino) with a suitable pendant moiety (e.g. carboxy) on that backbone to provide a ligand-releasing monomer.

(b) Reaction of a color coupler having a hydroxy or mercapto group with a LIG moiety containing a leaving group to produce the same kind of compound as described in (a).

In other embodiments, COUP-LINK-LIG can be prepared by condensation of a LIG-containing carboxylic acid halide or sulfonic acid halide with a color coupler containing a hydroxy, mercapto or amino group in the coupling position to produce COUP-LINK-LIG wherein LINK is an ester, amide, sulfonamide or thioester linkage. The resulting COUP-LINK-LIG compound is then attached to a suitable ethylenically unsaturated polymerizable monomer in a suitable manner to provide a ligand-releasing polymerizable monomer with the releasable ligand.

In still other embodiments, the LIG moiety can be attached to an ethylenically unsaturated polymerizable color coupler monomer having the general structure:

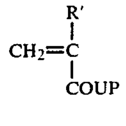

wherein R' and COUP are as defined above. The LIG moiety is attached to COUP through a LINK group using similar reactions and procedures as described above.

The ligand-releasing polymers of this invention can be prepared by polymerizing the polymerizable monomers described above using well known solution or emulsion polymerization techniques. Generally, the polymers are prepared using free radical initiated reactions of the monomers while either dissolved in one or more suitable solvents as in solution polymerization, or as dispersed as emulsions in water with a suitable surfactant in emulsion polymerization. Suitable solvents for solution polymerization include dimethylsulfoxide, N,N-dimethylformamide and N-methylpyrrolidone. The details of a representative polymer preparation are provided in Example 1 below.

Alternatively, a ligand-releasing polymer of this invention can be prepared by reacting a polymeric color coupler with a suitable compound from which LIG is derived using known techniques described above.

As noted above, LIG is a moiety capable of complexing with metal ions to provide desired dyes in one or more layers of photographic elements. A variety of metal ions can be so used as long as the complex of the LIG moiety with the metal ion is stable, or in other words, the complex is likely to remain in complexed form for a substantial period of time. In general, the formation constant of such complexes should be in the range of from about 10 to about 30, and preferably from about 15 to about 25. Useful metal ions include $Fe^{++}$, $Co^{++}$, $Cu^{+}$, $Cu^{++}$, $Ru^{++}$ and $Os^{++}$. Ferrous ions are preferred in the practice of this invention.

In the practice of this invention, cleavage of LINK-LIG from the rest of the polymer results from reaction of oxidized developing agent with the polymer. Any suitable developing agent, which when oxidized from silver halide development will react with the polymer, can be used in the practice of this invention. Particularly useful developing agents are color developing agents, including aminophenols, phenylendiamines, tetrahydroquinolines and the like as described, for example, in *Research Disclosure,* publication 17643, paragraph XX, noted above. Other useful developing agents include hydroquinones, catechols and pyrazolidones.

The photographic elements and film units of this invention can be processed by conventional techniques in which the processing solutions or compositions are incorporated in the element or are separately applied in a solution or process sheet. These solutions or compositions contain developing agents (e.g. color developing agents) and other conventional processing addenda, as well as metal ions to complex with LIG, if desired. Alternatively, the metal ions can be incorporated within the element in the same or different layer as the ligand-releasing polymer. More specifically, processing of the elements of this invention can be accomplished by treating an imagewise exposed element containing the polymer with an alkaline processing solution containing a color developing agent (and another developing agent, if desired) to form an imagewise distribution of LINK-LIG moiety which is washed out of the element. The ligand-releasing polymer in unexposed areas is treated with metal ions to provide a dye in those areas. The ferrous or other metal ions can be included in the bleach solution for complexation with the polymer.

Photographic elements of this invention in which the described polymers are incorporated can be elements comprising a support and one or more silver halide emulsion layers. The polymers can be incorporated in the silver halide emulsion layer or in another layer, such as an adjacent layer, where they will come into reactive association with oxidized color developing agent which has developed silver halide in the emulsion layer. The silver halide emulsion layer can also contain, or have associated with it, photographic coupler compounds, such as color forming couplers, etc. These coupler compounds can form dyes of the same or different color or hue as the dyes formed by complexation of LIG and metal ions. Additionally, the silver halide emulsion layer can contain addenda conventionally contained in such layers.

In a preferred embodiment of this invention, the polymer of this invention is used to provide a color correcting dye (or a color masking dye as it is sometimes known in the art). The polymer can be incorporated in a multilayer, multicolor photographic element which comprises a support having thereon a red-sensitive silver halide emulsion unit having associated therewith a cyan dye image providing material, a green-sensitive silver halide emulsion unit having associated therewith a magenta dye image providing material and a blue-sensitive silver halide emulsion unit having associated therewith a yellow dye image-providing material, at least one of the silver halide emulsion units having associated therewith a ligand-releasing polymer. Each silver halide emulsion unit can be composed of one or more layers and the various units and layers can be arranged in different locations with respect to one another as is known in the art. The polymers described herein can be incorporated into or associated with one or more units or layers of the element. Preferably, the polymer can provide a magenta masking dye in either the red-sensitive or blue-sensitive silver halide emulsion units.

The light sensitive silver halide emulsions can include coarse, regular or fine grain silver halide crystals or mixtures thereof and can be comprised of such silver halides as silver chloride, silver bromide, silver bromoiodide, silver chlorobromide, silver chloroiodide, silver chlorobromoiodide and mxitures thereof. The emulsions can be negative-working or direct-positive emulsions. They can form latent images predominantly on the surface of the silver halide grains or predominantly on the interior of the grains. They can be chemically and spectrally sensitized. The emulsions generally are gelatin-containing emulsions although other natural or synthetic hydrophilic colloids, soluble polymers or mixtures thereof can be used if desired.

The element support can be any suitable substrate used in photographic elements. Examples of such supports include films of cellulose nitrate, cellulose acetate, poly(vinyl acetal), polyesters [e.g. poly(ethylene terephthalate)], polycarbonates and other resinous materials, glass, metals, paper, and the like. Generally, a flexible paper or resinous film support is used, and a paper support is particularly useful. Paper supports can be acetylated or coated with baryta and/or an α-olefin polymer such as polyethylene, polypropylene, ethylene-butene copolymer and the like.

In another embodiment of this invention, the polymer of this invention can be used to generate a reversal image in an element using what are known in the art as "universal" couplers. This can be done by incorporating a ligand-releasing polymer in the element wherein COUP of the polymer is a moiety which yields a colorless or diffusible reaction product with oxidized developing agent and LIG is as defined above. Upon imagewise development with a developing agent, the dye-forming moiety of the polymer is cleaved from the polymer backbone in exposed areas and washed out of the element. Subsequent treatment of the element with metal ions provides dyes in the unexposed areas to provide a reversal image.

Further details regarding silver halide emulsions and photographic elements are well known in the art as described, for example, in *Research Disclosure*, publication 17643, noted above.

The following examples are presented to illustrate the practice of the present invention.

EXAMPLE 1

Preparation of Poly{{{N-{{4-chloro-3-{4,4-dimethyl-2-[2,6-di(2-pyridyl)-4-pyridyloxy]-3-oxopentanamido}phenyl}}acrylamide-co-sodium 2-acrylamido-2-methylpropane-1-sulfonate}}}(1:2.54 mole ratio)

Preparation of Ligand-Releasing Monomer:

The following were added to a 100 ml flask equipped with a stirrer: 2.5 g (10 mmoles) of 2,6-di-2-pyridyl-4-hydroxypyridine, 2.5 ml (20 mmoles) of tetramethylguanidine, 50 ml of $CH_3CN$ and 4.4 g (15 mmoles) of 4,4-dimethyl-2-chloro-N-(2-chloro-5-nitrophenyl)3-oxopentanamide. The resulting mixture was heated with stirring to 50° C. under nitrogen and then overnight at 20° C. The solution was concentrated, poured into water and the resulting yellow solid collected by filtration. The filter cake was triturated with hot benzene, then washed with dilute acetic acid. The resulting white solid was recrystallized from ethyl acetate yielding 3.4 g. The nuclear magnetic resonance and mass spectra were consistent with 4,4-dimethyl-2-[2,6-di(2-pyridyl)-4-pyridyloxy]-N-(2-chloro-5-nitrophenyl)-oxo-pentanamide. This material was hydrogenated using a conventional Parr shaker for 1 hour at 50 psi (about 3.45 bars) in 2:1 THF/acetone over platinum oxide. For every gram of the pentanamide, 20 ml of solvent and 75 mg of catalyst were used. The solution was filtered and the filtrate concentrated to give a white solid (95%) which was determined by mass spectral analysis to be 4-chloro-3-{4,4-dimethyl-2-[2,6-di(2-pyridyl)-4-pyridyloxy]-3-oxo-pentanamido}aniline.

A 15 ml glass bottle was then charged with 1.29 g of 4-chloro-3-{4,4-dimethyl-2-[2,6-di(2-pyridyl)-4-pyridyloxy]-3-oxopentanamido}aniline and 6.45 g of acrylic acid. The clear, brown solution which developed was stirred at ambient temperature as 0.314 g of acryloyl chloride was added dropwise over a 2-minute period. After stirring the resulting solution at ambient temperature for an additional 15 minutes, it was treated with 0.29 g of sodium acetate, sealed, and stirred an additional 4 hours. At this point the bottle was opened and the red-brown slurry it contained was treated with 10 ml of distilled water followed by titration with 25% sodium hydroxide. A sticky red-brown precipitate gradually formed which was removed from time to time to allowing stirring. Eventually, as the pH rose to 10, the removed precipitate was dissolved in 30 ml of dichloromethane and that solution shaken with the remaining aqueous mixture in a separatory funnel. Upon layer separation the dichloromethane solution was subsequently washed with two additional 20 ml portions of distilled water, dried over magnesium sulfate, and the volatiles stripped at room temperature on a rotary evaporator. The residue was 1.2 g of an ochre colored product. The nuclear magnetic resonance spectrum was consistent with the monomer, N-{{4-chloro-3-{4,4-dimethyl-2-[2,6-di(2-pyridyl)-4-pyridyloxy]-3-oxopentanamido}phenyl}}acrylamide.

Preparation of Polymer:

A 10 ml glass bottle was charged with 0.5 g of N-{{4-chloro-3-{4,4-dimethyl-2-[2,6-di(2-pyridyl)-4-pyridyloxy]-3-oxopentanamido}phenyl}}acrylamide, 0.5 g of sodium 2-acrylamido-2-methylpropane-1-sulfonate, and 3.0 g of reagent grade dimethylsulfoxide. Upon stirring, a clear red-brown solution was formed which was then treated with 0.005 g of 2,2'-azobis(2-methylpropionitrile) polymerization initiator and sparged with nitrogen for 40 minutes. The bottle was then immersed in a 60° C. bath and the sparging continued for 1 hour. It was then sealed and kept at 60° C. for an additional 3.5 hours. At this point the bottle was opened, another 0.005 g of initiator added, sparged with nitrogen for 15 minutes, resealed, and kept at 60° C. overnight. The viscous, clear dope which resulted was poured in a fine stream into 35 ml of stirring acetone. The frangible precipitate which formed was readily broken down into a powder. After washing it with five successive 35 ml portions of acetone it was dried at room temperature under nitrogen/vacuum. The dry tan powder which resulted comprised 0.80 g of the desired ligand-releasing polymer.

EXAMPLE 2

Photographic Evaluation of the Polymer of Example 1

A 3:1 molar mixture of a conventional yellow dy-providing color coupler having the structure:

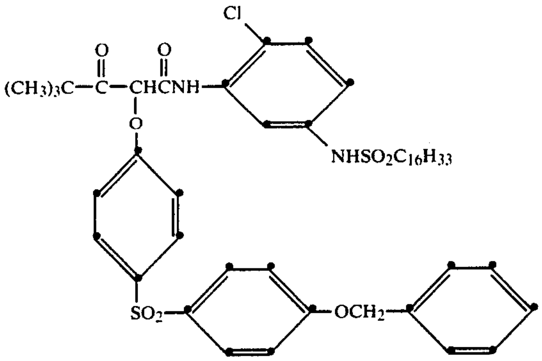

and the polymer of Example 1 was mixed with half their weight of dibutyl phthalate and three times their weight of ethyl acetate. The above mixture became homogeneous upon addition of aqueous gelatin. The coating levels on a suitable support were 3.8 $g/m^2$ of gelatin, 756 $mg/m^2$ of silver, 1.8 $g/m^2$ of the conventional coupler and 764 $mg/m^2$ of the polymer of Example 1. The resulting element strips were stepwise exposed, developed using a conventional pH 10 color developer and bleached with a fresh solution of conventional bleach. No masking dye scale was observed under these conditions but seasoned bleach or dilute ammonium ferrous sulfate solutions did generate the magenta color correcting dye scale. The ligand-releasing polymer of this invention provided acceptable color correction of the resulting developed element.

EXAMPLE 3

Comparative Example

This is an example comparing the metallization, or dye formation, rates of a hydrophilic ligand-releasing polymer of this invention to the rates of a nonpolymeric ligand-releasing compound described in the Washburn application referenced above.

The rate of metallization of the polymer described in Example 1 were determined in a conventional ferric ethylene diamine tetraacetic acid (EDTA) bleach at different ferrous ion concentrations shown in Table I below and at pH 6.1. The resulting ferrous ion concentrations in the bleach solutions correspond to those normally encountered in conventional photofinishing conditions. The extent of complexation was followed by measuring the resultant magenta dye density at 560 nm. Samples of gelatin (3.8 $g/m^2$) coatings of the polymer (3.1 $g/m^2$) on a support were immersed in a sufficiently large amount (100 ml) of each bleach solution to insure that the ferrous ion concentration would not be changed as metallization occurred. The rate constants are presented in Table I below as a function of ferrous ion concentration.

TABLE I

| Ferrous Ion Concentration (g/l) | Metallization Rate ($sec^{-1}$) Polymer |
|---|---|
| 0.3 | $5.9 \times 10^{-4}$ |
| 0.6 | $9.2 \times 10^{-4}$ |
| 0.76 | $1.0 \times 10^{-3}$ |
| 0.82 | $1.2 \times 10^{-3}$ |

A nonpolymeric ligand-releasing compound was similarly tested. This compound had the structure:

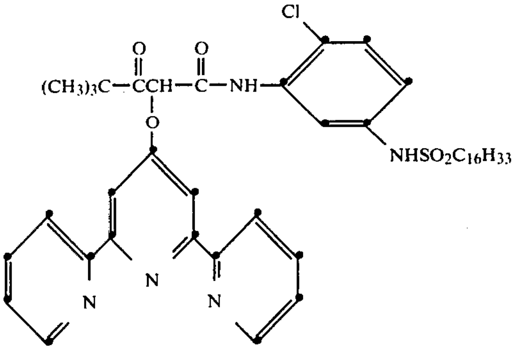

This compound (2.2 $g/m^2$) was coated with gelatin (3.8 $g/m^2$) and dibutyl phthalate coupler solvent on a suitable support.

Table II compares the rate of metallization of the nonpolymeric ligand-releasing compound to the rate of the polymeric compound as a function of pH.

TABLE II

| Ferrous Ion Concentration (g/l) in Bleach* | pH | Metallization Rate ($sec^{-1}$) Polymeric Compound | Nonpolymeric Compound |
|---|---|---|---|
| 0.76 | 6.1 | $1 \times 10^{-3}$ | $7.8 \times 10^{-5}$ |
| 0.66 | 4.7 | $1.27 \times 10^{-2}$ | $1.03 \times 10^{-3}$ |

*Conventional ferric-EDTA bleach described above.

When using a pH 6.1 aqueous ferrous sulfate solution ($Fe^{+2}$=0.02 g/l) the nonpolymeric compound metallized 16 times more slowly than the polymeric compound. For example, 74% metallization was obtained in 15 seconds with the polymeric compound whereas 4 minutes were required for 74% metallization of the nonpolymeric compound.

The invention has been described in detail with particular reference to preferred embodiments thereof, but it will be understood that variations and modifications can be effected within the spirit and scope of the invention.

We claim:

1. An essentially colorless, hydrophilic ligand-releasing polymer comprising:

(a) recurring units derived from an ethylenically unsaturated polymerizable hydrophilic monomer in a number sufficient to render said polymer hydrophilic, and (b) recurring units derived from an ethylenically unsaturated polymerizable monomer represented by the structure:

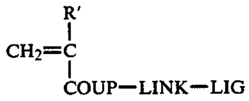

wherein R' is hydrogen or lower alkyl,

LINK is —COO—, —CONH—, —O—, —S—, $—SO_2O—$ or $—SO_2NH—$ COUP is a photographic color coupling moiety which can be cleaved from LINK by an oxidized developer composition, and LIG is a ligand capable of complexing with metal ions, while joined to said polymer, to form a dye.

2. The polymer of claim 1 wherein LIG is derived from a compound having the structure:

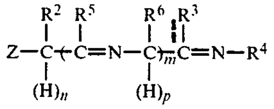

wherein m is 0 or a positive integer of 1 to 3, n and p are independently 0 or 1, == represents a single or double bond, Z is $R^1$—N=, O=, S=, $R^1$—P=, $(R^1)_2P$— or $(R^1)_3P$=, and when Z is $(R^1)_2P$—, n is 1, otherwise n is 0, $R^1$, $R^2$, $R^3$, $R^4$, $R^5$ and $R^6$ are independently hydrogen, amino, hydroxy, mercapto, alkoxy, alkyl, aryl or a heterocyclic moiety, and when $R^6$ is so defined, p is 1 and == is a single bond, if m is 0, $R^1$ and $R^2$, $R^2$ and $R^3$, and $R^3$ and $R^4$, taken together, can independently represent the carbon and heteroatoms necessary to complete a substituted or unsubstituted carbocyclic or heterocyclic nucleus, or, if m is 1 to 3, $R^1$ is $R^2$, $R^5$ and $R^6$, and $R^3$ and $R^4$, taken together, can independently represent the carbon and heteroatoms necessary to complete a substituted or unsubstituted heterocyclic nucleus, and when $R^5$ and $R^6$ are so defined, p is 0 when == is a double bond and p is 1 when is a single bond.

3. The polymer of claim 2 wherein m is 0 or 1 and Z is $R^1$—N=.

4. The polymer of claim 1 wherein the monomer of (a) either is uncharged and has a hydroxy or amide moiety, or has an ionic group.

5. The polymer of claim 1 comprising from about 10 to about 90 mole percent of (a) and from about 90 to about 10 mole percent of (b).

* * * * *